United States Patent [19]

Fauss et al.

[11] Patent Number: 4,515,923

[45] Date of Patent: May 7, 1985

[54] POLYAMINES AND A PROCESS FOR THEIR PRODUCTION

[75] Inventors: Rudolf Fauss, Cologne; Hans J. Meiners, Leverkusen; Werner Rasshofer, Cologne; Holger Meyborg, Odenthal, all of Fed. Rep. of Germany

[73] Assignee: Bayer Aktiengesellschaft, Leverkusen, Fed. Rep. of Germany

[21] Appl. No.: 506,471

[22] Filed: Jun. 21, 1983

[30] Foreign Application Priority Data

Jun. 23, 1982 [DE] Fed. Rep. of Germany ....... 3223398

[51] Int. Cl.³ .................. C08G 18/18; C09K 3/00
[52] U.S. Cl. ..................... 525/127; 252/182; 525/131; 525/452; 525/453; 525/454; 525/455; 528/53; 528/54; 528/57; 528/60; 528/61; 528/64; 528/65; 528/68; 528/499; 564/61; 564/393; 564/414; 564/511
[58] Field of Search ............... 525/127, 131, 452, 453, 525/454, 455; 528/53, 54, 57, 60, 65, 68, 499, 61, 64; 564/61, 511, 393, 414; 252/182

[56] References Cited

U.S. PATENT DOCUMENTS

| | | | |
|---|---|---|---|
| 2,888,439 | 5/1959 | Simons | 528/59 |
| 3,044,989 | 7/1962 | Shivers, Jr. | 528/372 |
| 3,385,829 | 5/1968 | Heydkamp et al. | 528/68 |
| 3,404,103 | 10/1968 | Matsudaira et al. | 564/393 |
| 3,536,668 | 10/1970 | Wieden et al. | 528/59 |
| 3,592,854 | 4/1971 | Potts et al. | 564/414 |
| 3,625,871 | 12/1971 | Traubel et al. | 414/693 |
| 3,808,250 | 4/1974 | Blahak et al. | 521/163 |
| 3,865,791 | 2/1975 | Brinkmann et al. | 528/73 |
| 4,129,741 | 12/1978 | Schmidt et al. | 560/50 |
| 4,153,801 | 5/1979 | Schmidt et al. | 548/312 |
| 4,163,831 | 8/1979 | Gessell | 526/153 |
| 4,169,206 | 9/1979 | Mazanek et al. | 560/50 |
| 4,172,050 | 10/1979 | Gessell | 252/431 R |
| 4,180,644 | 12/1979 | Marquis et al. | 528/68 |
| 4,198,348 | 4/1980 | Bertini et al. | 564/414 |
| 4,224,417 | 9/1980 | Hajek et al. | 521/166 |
| 4,386,218 | 3/1983 | Rasshofer et al. | 528/68 |

FOREIGN PATENT DOCUMENTS

| | | |
|---|---|---|
| 920475 | 3/1963 | United Kingdom . |
| 1033912 | 6/1966 | United Kingdom . |
| 1117494 | 6/1968 | United Kingdom . |

OTHER PUBLICATIONS

H. John, J. Prakt Chemie, 130, pp. 314 et seq.-pp. 332 et seq.-1931.
H. Ulrich et al.-J. Org. Chem., 33, 3928-3930-(1968).

*Primary Examiner*—Lester L. Lee
*Assistant Examiner*—Kriellion Morgan
*Attorney, Agent, or Firm*—Gene Harsh; Joseph C. Gil; Lyndanne M. Whalen

[57] ABSTRACT

Polyamines containing aromatically bound primary amino groups having an $NH_2$-content of from 0.19 to 20.3 wt % are produced by a single stage process. A compound containing aromatically bound NCO-groups and having an isocyanate content of from 0.5 to 40 wt % is hydrolyzed with an excess of water in the presence of a water-miscible polar solvent and optionally a catalyst. The hydrolysis is carried out at a temperature of from $-10°$ to $150°$ C. in a manner such that the reaction mixture is substantially homogeneous. The water-miscible polar solvent generally has a boiling point of from $56°$ to $250°$ C. and a dielectric constant of at least 10. This polar solvent is used in a quantity of at least 5 parts solvent for every 100 parts of isocyanate. Tertiary amines are the preferred catalysts. These polyamines are particularly useful in the production of polyurethanes.

12 Claims, No Drawings

POLYAMINES AND A PROCESS FOR THEIR PRODUCTION

BACKGROUND OF THE INVENTION

The present invention relates to a simplified process for the production of polyamines containing primary aromatically bound amino groups by the hydrolysis of compounds containing terminal aromatic isocyanate groups.

It is known that aromatic isocyanates can be converted into primary aromatic amides by acid hydrolysis, however, the reaction does not go to completion because the amine formed during hydrolysis further reacts with unreacted isocyanate to form the corresponding urea. This further reaction cannot be suppressed even by using excess, strong mineral acid. One example of such a procedure can be found in Japanese Pat. No. 55 007-827.

German Offenlegungsschrift No. 1,270,046 describes a process for the production of defined primary aromatic amines containing polyalkylene glycol ether segments. In this disclosed process reaction products of aromatic diisocyanates or triisocyanates with polyalkylene glycol ethers and/or polyalkylene glycol thioethers, (preferably those having molecular weights of from 400 to 4000) are reacted with secondary or tertiary carbinols. The product of this reaction is then subjected to thermal cleavage at elevated temperatures in an inert solvent (and optionally in the presence of acid catalysts). Besides the high cleavage temperature, this process is also disadvantageous in that the thermal cleavage of the urethanes is accompanied by the formation of inflammable, readily volatile alkenes which are explosive in admixture with air.

German Auslegeschrift No. 1,694,152 describes the production of prepolymers containing at least two terminal amino groups by reacting hydrazine, aminophenyl ethylamine or other diamines with an NCO-prepolymer of a polyether polyol and polyisocyanate (NCO:NH-ratio=1:1.5 to 1:5). In this disclosed process, unreacted amine must be carefully removed in another step because it catalyzes the reaction with polyisocyanates to a considerable extent (leading to short processing times) and even acts as a reactant.

Another possible method for synthesizing polyamines containing urethane groups is described in French Pat. No. 1,415,317. In this disclosed process, NCO-prepolymers containing urethane groups are converted with formic acid into the N-formyl derivatives which are hydrolyzed to form terminal aromatic amines. The reaction of NCO-prepolymers with sulfamic acid according to German Offenlegungsschrift No. 1,555,907 also yields compounds containing terminal amino groups. Relatively high molecular weight prepolymers containing aliphatic, secondary and primary amino groups are obtained according to German Offenlegungsschrift No. 1,215,373 by reacting relatively high molecular weight hydroxyl compounds with ammonia under pressure at elevated temperature in the presence of catalysts. U.S. Pat. No. 3,044,989 describes production of such prepolymers by reacting relatively high molecular weight polyhydroxyl compounds with acrylonitrile, followed by catalytic hydrogenation. Relatively high molecular weight compounds containing terminal amino groups and urethane groups may also be obtained by reacting NCO-prepolymers with enamines, aldimines or ketimines containing hydroxyl groups, followed by hydrolysis (German Auslegeschrift No. 2,546,536 and U.S. Pat. No. 3,865,791). Another possibility for synthesizing aromatic polyamines containing urethane and ether groups is the opening of the ring which occurs in the reaction of the isatoic acid anhydride and diols. Polyamines of this type are described, for example, in U.S. Pat. No. 4,180,644 and in German Auslegeschriften Nos. 2,019,432; 2,619,840; 2,648,774 and 2,648,825. The poor reactivity of aromatic ester amines obtained in this way is a disadvantage in numerous applications.

The reaction of nitroaryl isocyanates with polyols, followed by reduction of the nitro groups to aromatic amino groups is described in U.S. Pat. No. 2,888,439. The main disadvantage of this process is the high cost of the reduction step.

It is also known that certain heteroaromatic isocyanic acid esters can be converted into heteroaromatic amines by hydrolysis in a pH-basic medium. Unfortunately, the hydrolysis conditions described by H. John in J. Prakt. Chemie 130, 314 et seq and 332 et seq (1931) for two specific, heteroaromatic monoisocyanic acid esters are totally unsuitable for the conversion of polyisocyanates into aliphatic and/or aromatic amines and they are also dangerous.

Multistage processes for the production of polyamines have also been developed. In such processes, NCO-prepolymers are hydrolyzed with excess base (alkali hydroxides) to form carbamates. The carbamate-containing mixture is then acidified with mineral acids or ion exchanger resins in an equivalent quantity or in a quantity exceeding the quantity of base to decompose the carbamates. Excess quantities of acid may be neutralized with a base and the polyamines subsequently isolated.

From the above-described processes it can be readily appreciated that known processes for the production of polyamines are complicated. It would therefore be desirable to develop a commercially workable process which is technically simple and efficient.

Previous attempts to obtain satisfactory yields of polyamines by direct hydrolysis of polyisocyanates in a single stage have been unsuccessful. Instead of the desired hydrolysis products, the products obtained are only partially homogeneous, they do not flow freely and they contain a large number of urea groups but very few, if any, amino groups (see Comparison Examples infra). One possible explanation for the poor quality of these products is that the isocyanate/amine reaction is considerably faster than the isocyanate/water reaction.

German Auslegeschrift No. 1,235,499 teaches that solutions of NCO-prepolymers in dimethyl formamide could be converted with substantially equivalent quantities of water (80 to 120% of the theoretical) into highly viscous solutions which are suitable for spinning elastane spandex filaments or for coatings.

It is also known that isocyanates react with dialkyl formamide to form formamidines (H. Ulrich et al, J. Org. Chem. 33, 3928–3930 (1968)).

SUMMARY OF THE INVENTION

It is an object of the present invention to provide a single stage process for the production of polyamines containing aromatically bound primary amino groups.

It is also an object of the present invention to provide a single stage process for the production of polyamines containing aromatically bound primary amino groups in which isocyanate groups are converted to amino groups to a high degree.

It is a further object of the present invention to produce polyamines containing aromatically bound primary amino groups having an $NH_2$ content of from 0.19 to 20.3 wt %.

These and other objects which will be apparent to those skilled in the art are accomplished by hydrolyzing a compound containing aromatically bound NCO-groups which has an NCO-content of from 0.5 to 40 wt % with an excess of water in the presence of a water-miscible polar solvent. This hydrolysis is conducted at a temperature of from $-10°$ to $150°$ C. in a manner such that the reaction mixture is kept substantially homogeneous. The water-miscible polar solvent employed generally has a boiling point of from $56°$ to $250°$ C. and a dielectric constant of at least 10. This polar solvent is used in a quantity of at least 5 parts solvent for every 100 parts of isocyanate starting material.

DETAILED DESCRIPTION OF THE INVENTION

It has now surprisingly been found that single-stage hydrolysis of polyisocyanates (even when carried out in the absence of catalysts) does yield polyamines with a high $NCO/NH_2$-conversion provided the reaction is carried out in selected, water-miscible polar solvents. This hydrolysis may be carried out in the presence of compounds such as tertiary amines which accelerate the isocyanate/water reaction and other catalysts described in more detail below.

The process of the present invention is more advantageous than conventional processes for converting polyisocyanates into polyamines in several respects. More specifically, since the carbamate does not have to be formed in a first stage carried out at a low temperature, and subsequently converted into the amine in a second stage (by the addition of an acid), shorter reaction times and higher volume/time yields are obtained in the single-stage one-pot process of the present invention. Further, the "after-reaction time", i.e. the reaction time after complete addition of the NCO-compound, may be eliminated or kept very short in the present invention. In general, after-reaction times of less than 5 minutes are quite sufficient. NCO-prepolymers based on polyesters and lactone esters may also be hydrolyzed in accordance with the present invention without cleavage of the ester groups. Additionally, working-up of the reaction mixture is easier. On completion of the reaction, the solvent and water and any catalyst used may be separated off by extraction or preferably by distillation and recycled.

In conventional two-stage processes, alkali salts form. These salts must be filtered off and discarded or washed off thereby forming salt-containing effluents. In some cases, such salts are very difficult to remove from the polyamines (particularly those based on hydrophilic polyoxyalkylene ethers with oxyethylene segments).

The present invention relates to a single-stage process for the production of polyamines containing aromatically bound primary amino groups by the hydrolysis of compounds containing aromatically bound NCO-groups. In this process, compounds containing aromatically bound NCO-groups having an NCO-content of from 0.5 to 40 wt %, preferably from 1.2 to 25 wt % and most preferably from 1.5 to 15 wt % are hydrolyzed with excess quantities of water amounting to at least 2 moles (and preferably $\geq 5$ moles) of water for each equivalent of NCO-groups in the presence of a water-miscible polar solvent. This polar solvent contains carboxylic acid dialkyl amide, lactam, tetraalkyl urea, sulfone, sulfoxide, phosphoric acid dialkylamide, nitrile and/or ketone groups and has a boiling point in the range from $56°$ to $250°$ C. (preferably in the range from $80°$ to $200°$ C.) and a dielectric constant of at least 10. This solvent is used in a quantity of at least 5 (preferably at least 10) parts by weight for each 100 parts of isocyanate. Co-catalysts in the form of at least 0.1 part (preferably at least 1 part) per 100 g of NCO-compound of tertiary amine and/or 0.01 to 1 wt % of metal catalysts and/or 1 to 10 parts by weight per 100 parts of isocyanate of hydroxides of the first, second and/or third Main Group of the Periodic System of Elements; alkali silicates, alkali sulfides, alkali cyanides; and optionally in combination with these catalysts, 0.1 to 10 parts by weight of alkali carbonates, alkali hydrogen carbonates and/or alkali and alkaline earth metal salts of mono- or polycarboxylic acids, preferably alkali metal salts of aliphatic $C_2$-$C_{10}$-monocarboxylic acids for each 100 parts of isocyanate may also be used. This hydrolysis is carried out at a temperature in the range from $-10°$ to $+150°$ C. and preferably from $80°$ to $130°$ C. The reaction mixture should be kept substantially homogeneous during the hydrolysis reaction.

In the process of the present invention, at least 40 parts and preferably at least 60 parts of water plus polar solvent plus catalyst are used for each 60 parts (preferably each 40 parts) of isocyanate. A homogeneous reaction phase should be maintained in the mixture at the reaction temperature.

In the present invention, small quantities of from 0.1 to 5 wt % of a compound containing at least one, two or more hydroxy and/or amino and/or thiol groups attached to aliphatic, cycloaliphatic or aromatic radicals may be included in the reaction mixture. The use of these compounds containing "H-active groups" makes it possible to produce polyamines substantially free from monomeric polyamine from NCO-compounds containing free low molecular weight polyisocyanates (for example NCO-semiprepolymers) without reacting the NCO-compounds by thin-layer distillation or similar processes. It is also possible to produce modified polyamines which, in one molecule, contain polyamine segments (optionally of different types) attached through urethane groups, thiourethane groups or urea groups in an associated reaction step. If a trifunctional or higher compound containing "H-active groups" is used in the NCO-hydrolysis reaction, it is also possible to obtain a trifunctional or higher polyamine from a difunctional NCO-compound.

The present invention also relates to polyamines containing from 0.19 to 20.3 wt %, preferably from 0.46 to 11.3 wt % and, most preferably, from 0.58 to 4.1 wt % of aromatically bound primary amino groups obtained by the process of the present invention.

The polyamines containing aromatically bound primary $NH_2$-groups of the present invention are useful in the production of polyurethanes and optionally cellular polyurethane plastics and polyurethane foams. Polyurethanes may be produced by reacting polyisocyanates and/or blocked polyisocyanates with the polyamines of the present invention and, optionally, other low molecular weight and/or relatively high molecular weight compounds containing isocyanate-reactive groups, optionally in the presence of known auxiliaries, additives and/or solvents.

In one embodiment of the present invention, water and the polar solvent are initially introduced. A compound which accelerates the isocyanate/water reaction may be added. The mixture is gently refluxed and the NCO-group-containing compound is added with thorough mixing. The reaction takes place from the substantially homogeneous solution and is accompanied by the immediate elimination of $CO_2$. The reaction mixture may be worked up by distillation either directly or optionally after brief heating. In some cases, phase separation may be obtained by cooling before working up. In this case, only the phase containing the polyamine is worked up. The other phase may be immediately used for another reaction.

The NCO-compounds suitable for use in the process of the present invention contain two or more aromatic free NCO-groups and are modified aromatic polyisocyanates of the type formed by the partial conversion of the isocyanate groups into urethane, urea, biuret or uret dione or isocyanurate groups, or NCO-prepolymers of polyfunctional compounds containing NCO-reactive H-groups and having a molecular weight in the range from 62 to 12,000 and (excess) quantities of aromatic polyisocyanates or optionally semiprepolymers of NCO-prepolymers and additional low molecular weight polyisocyanates.

Suitable modified aromatic polyisocyanates are polyisocyanates containing urethane groups (polyol-modified); polyisocyanates containing urea groups (water-modified, German Pat. No. 1,230,778); polyisocyanates containing biuret groups (U.S. Pat. Nos. 3,124,605 and 3,201,372 and British Pat. No. 889,050); polyisocyanates containing isocyanurate groups (German Pat. Nos. 1,022,789 and 1,222,067); and dimeric or oligomeric polyisocyanates containing uret dione groups which may be obtained by known methods. Several such uret dione polyisocyanates are described in Analytical Chemistry of the Polyurethanes, Vol. 16/III, High-Polymers-Series (Wiley 1969).

Modified polyisocyanates containing urethane and/or urea and/or biuret and/or uret dione and/or isocyanurate groups of the type suitable for use in the process of the present invention generally have an NCO-content of from 5 to 40 wt % (preferably from 10 to 25 wt %) and are substantially free from urethane groups.

However, the NCO-compounds used in the process of the present invention are preferably NCO-prepolymers of the type obtained by reacting low molecular weight and/or relatively high molecular weight hydroxy and/or amino and/or thiol groups as compounds containing reactive groups (molecular weight 62 to approximately 12,000) with an excess of aromatic polyisocyanates in accordance with techniques known to those in the art.

Aromatic polyisocyanates suitable for use in the production of compounds containing free NCO-groups are, in principle, any aromatic and/or heterocyclic polyisocyanates which are substantially free from readily hydrolyzable groups other than the NCO-groups. Such polyisocyanates are described for example by W. Siefken in Justus Liebigs Annalen der Chemie, 562, pages 75 to 136. Suitable polyisocyanates correspond to the formula $Q(NCO)_n$, in which $n = 2$ to 4 (preferably 2) and Q represents a hydrocarbon radical containing from 4 to 15 carbon atoms; an aromatic hydrocarbon radical containing from 6 to 15 carbon atoms (preferably from 6 to 13 carbon atoms) such as 1,3- and 1,4-phenylene diisocyanate, 2,4- and 2,6-tolylene diisocyanate and mixtures of these isomers, diphenyl methane-2,4'- and/or 4,4'- and/or -2,2'-diisocyanates, including the alkyl- and chlorine-substituted derivatives, and naphthylene-1,5-diisocyanate. Suitable diisocyanates are also the 2,4'-diisocyanatodiphenyl sulfides described in German Published Application No. 2,922,966 and the alkyl-substituted diphenyl methane diisocyanates described for example in European Pat. No. 24,665 and German Published Application No. 2,935,318.

Other suitable polyisocyanates include: triphenyl methane-4,4',4''-triisocyanate; polyphenyl polymethylene polyisocyanates of the type obtained by condensing aniline with formaldehyde, followed by phosgenation, and described for example in British Pat. Nos. 874,430 and 848,671; m- and p-isocyanatophenyl sulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing isocyanurate groups (described in U.S. Pat. No. 3,001,973, German Pat. Nos. 1,022,789; 1,222,067; 1,027,394; 1,929,034 and 2,004,048); polyisocyanates containing urethane groups described, for example, in Belgian Pat. No. 752,261 and in U.S. Pat. Nos. 3,394,164 and 3,644,457; polyisocyanates containing acylated urea groups according to German Pat. No. 1,230,778; and polyisocyanates produced by telomerization reactions of the type described in U.S. Pat. No. 3,654,196. It is also possible to use diaryl alkylene diisocyanates obtained by the polymerization of acrylonitrile and, optionally, other ethylenically unsaturated monomers in the diaryl alkylene diisocyanates using the method disclosed in European Patent Application No. 37,112 (U.S. Pat. No. 4,283,500).

In general, it is preferred to use commercially readily available polyisocyanates such as 2,4- and 2,6-tolylene diisocyanate, and mixtures of these isomers ("TDI"); polyphenyl polymethylene polyisocyanates of the type produced by condensing aniline with formaldehyde, followed by phosgenation ("crude MDI"); and polyisocyanates containing urethane groups, isocyanurate groups or urea groups ("modified polyisocyanates"). The modified polyisocyanates derived from 2,4- and/or 2,6-tolylene diisocyanate (TDI) and from 4,4'- and/or 2,4'- and/or 2,2'-diphenyl methane diisocyanate (MDI) are particularly preferred. From a technical point of view, use of TDI and MDI (or their isomer mixtures) for production of the NCO-prepolymers is of greatest importance.

Compounds preferably used in the production of the NCO-prepolymers are relatively high molecular weight compounds having a molecular weight in the range from 400 to 12,000 (preferably from 400 to 6,000) and containing at least 1.9 (preferably from 2 to 4 and, most preferably from 2 to 3) reactive hydroxyl, amino and/or thiol groups (preferably hydroxyl groups) as reactive groups per mole. Suitable compounds of this type are the polyacetals, polythioethers, polycarbonates, polyamides, polysiloxanes and/or polybutadienes containing isocyanate-reactive groups which are commonly used in polyurethane chemistry. Polyesters, polylactones and polyethers (especially polyethers) containing hydroxyl groups are particularly advantageous.

The polyethers containing at least two, generally two to eight and preferably two to three hydroxyl groups which are preferably used to produce the prepolymers useful in the present invention are known to those in the art. Such polyethers may be obtained, for example, by polymerizing epoxides (such as ethylene oxide, propylene oxide, butylene oxide, tetrahydrofuran, styrene oxide or epichlorohydrin) on their own in the presence of a Lewis catalyst such as $BF_3$, or by the addition of these epoxides (preferably ethylene oxide and propylene oxide) optionally in admixture or successively, with starter components containing reactive hydrogen atoms. Suitable starter components include water, alcohols, ammonia and amines. Specific examples are ethylene glycol, 1,3- or 1,2-propane diol, trimethylol propane, glycerol, sorbitol, 4,4'-dihydroxy diphenyl propane, aniline, ethanolamine and ethylene diamine. Sucrose polyethers and formitol-started or formose-started polyethers may also be used. In many cases, it is preferred to use polyethers of the type which contain predominantly primary OH-groups (up to 90 wt %, based on all the OH-groups present in the polyether).

Polybutadienes containing OH-, NH- and/or SH-groups are also suitable for use in accordance with the present invention (cf. Progress Org. Coatings, Vol. 7 (3), 289-329 (1979)).

Suitable polyacetals are those obtainable from glycols (such as diethylene or triethylene glycol, 4,4'-dihydroxy ethoxy diphenyl methane, hexane diol and formaldehyde) or compounds obtainable by the polymerization of cyclic acetals such as trioxane.

Suitable polycarbonates containing hydroxyl groups are known. Such polycarbonates may be obtained by reacting diols such as 1,3-propane diol, 1,4-butane diol and/or 1,6-hexane diol, di-, tri- or tetraethylene glycol or thiodiglycol with diaryl carbonates (e.g., diphenyl carbonate) or phosgene (German Published Application Nos. 1,694,080; 1,915,908; 2,221,751 and 2,605,024).

Preferred polyesters of dicarboxylic acids and diols are those of adipic acid and isophthalic acid and straight-chain and/or branched diols. Lactone polyesters, preferably based on caprolactone and starter diols are also preferred.

The condensation products of thiodiglycol on its own and/or with other glycols are particularly useful polythioethers.

Polyhydroxyl compounds which already contain urethane or urea groups and optionally modified natural polyols may also be used. Addition products of alkylene oxides with phenol-formaldehyde resins or with urea-formaldehyde resins may also be used in the practice of the present invention. It is also possible to introduce amide groups into the polyhydroxyl compounds by the procedure described in German Published Application No. 2,559,372.

It is also possible to use polyhydroxyl compounds containing high molecular weight polyadducts and polycondensates or polymers in finely dispersed or dissolved form in the practice of the present invention. Polyhydroxyl compounds such as these may be obtained by polyaddition reactions (for example reactions between polyisocyanates and aminofunctional compounds) and polycondensation reactions (for example between formaldehyde and phenols and/or amines) in situ in the above-mentioned compounds containing hydroxyl groups. Processes such as these are described in German Published Application Nos. 1,168,075; 1,260,142; 2,324,134; 2,423,984; 2,512,385; 2,513,815; 2,550,796; 2,550,797; 2,550,833; 2,550,862; 2,633,293 and 2,639,254. However, it is also possible in accordance with U.S. Pat. No. 3,869,413 or German Published Application No. 2,555,860 to mix an aqueous polymer dispersion with a polyhydroxyl compound and subsequently to remove the water from the mixture.

Polyhydroxyl compounds modified by vinyl polymers obtained by polymerizing styrene and acrylonitrile in the presence of polyethers (U.S. Pat. Nos. 3,383,351; 3,304,273; 3,523,093 and 3,110,695; German Published Application No. 1,152,536) or polycarbonate polyols (German Pat. No. 1,769,795; U.S. Pat. No. 3,637,909) are also suitable for use in the practice of the present invention. Plastics having particularly good flameproof properties may be obtained by using polyether polyols which have been modified in accordance with German Published Application Nos. 2,442,101, 2,644,922 and 2,646,141 by graft polymerization with vinyl phosphonic acid esters and, optionally, (meth)acrylonitrile, (meth)acrylamide or OH-functional (meth)acrylic acid esters.

Starting components which, in the polyisocyanate polyaddition process, often give polyurethane plastics having significantly improved mechanical properties are formed where modified polyhydroxyl compounds are used as starting materials for the polyamides.

Representatives of the above-mentioned compounds useful in the production of prepolymers useful as starting materials in the process of the present invention are described, for example, in High Polymers, Vol. XVI, "Polyurethanes, Chemistry and Technology" by Saunders-Frisch, Interscience Publishers, New York/London, Vol. I, 1962, pages 32-42 and pages 44-54 and Vol. II, 1964, pages 5-6 and 198-199, and in Kunststoff-Handbuch, Vol. VII, Vieweg-Hochtlen, Carl-Hanser-Verlag, Munich, 1966, for example on pages 45 to 71. It is also possible to use mixtures of the above-mentioned compounds containing at least two isocyanate-reactive hydrogen atoms and having a molecular weight of from 400 to 12,000 (for example mixtures of different polyethers).

Other starting components which may optionally be used in the production of NCO-prepolymers useful in the process of the present invention are compounds containing at least two isocyanate-reactive hydrogen atoms and having a molecular weight in the range from 18 to 399 (preferably from 62 to 399). These compounds are compounds containing water and/or hydroxyl groups and/or amino groups and/or thiol groups, preferably hydroxyl groups, of the type commonly used as chain-extending or cross-linking agents in polyurethane chemistry. These compounds generally contain from 2 to 8 and preferably from 2 to 4 isocyanate-reactive hydrogen atoms. It is also possible to use mixtures of different compounds containing at least two isocyanate-reactive hydrogen atoms and having a molecular weight in the range from 62 to 399.

Specific examples of these low molecular weight isocyanate-reactive compounds are water; ethylene glycol; 1,2- and 1,3-propane diol; 1,4- and 2,3-butane diol; 1,5-pentane diol; 1,6-hexane diol; 1,8-octane diol; neopentyl glycol; 1,4-bis-hydroxymethyl cyclohexane; 2-methyl-1,3-propane diol; dibromobutene diol; glycerol; trimethylol propane; 1,2,6-hexane triol; trimethylol ethane; pentaerythritol; quinitol; mannitol; sorbitol; dianhydrosorbitol; dianhydromannitol; castor oil; di-, tri- and tetra-ethylene glycol; di-, tri- and tetrapropylene glycol; dibutylene glycol; higher polyethylene, polypropylene or polybutylene glycols having a molecular weight of up to 399; 4,4'-dihydroxy diphenyl propane; dihydroxy ethyl hydroquinone; ethanolamine, diethanolamine; N-methyl diethanolamine; triethanolamine and 3-aminopropanol.

Other low molecular weight polyols suitable for the present invention are mixtures of hydroxy aldehydes and hydroxy ketones ("formose") or the polyhydric alcohols obtained therefrom by reduction ("formitol") which are formed in the autocondensation of formaldehyde hydrate (German Published Applications Nos. 2,639,084 and 2,714,084).

Aliphatic diamines suitable for use in accordance with the present invention are, for example, ethylene diamine; 1,4-tetramethylene diamine; 1,6-hexamethylene diamine; 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenyl methane, p-xylylene diamine; bis-(3-aminopropyl)-methylamine; diaminoperhydroanthracenes (German Published Application No. 2,638,731) and cycloaliphatic triamines (German Published Application No. 2,614,244). Hydrazine and substituted hydrazines such as methyl hydrazine or dihydrazide compounds, may also be used in accordance with the present invention.

Examples of appropriate aromatic diamines are the diamines containing ether groups (German Published Applications Nos. 1,770,525 and 1,809,172 (U.S. Pat. Nos. 3,654,364 and 3,736,295)); 2-halogen-1,3-phenylene diamines optionally substituted in the 5-position (German Published Application Nos. 2,017,772; 2,025,896 and 2,065,869); 3,3'-dichloro-4,4'-diaminodiphenyl methane; tolylene diamine; 4,4'-diaminodiphenyl methane; 4,4'-diaminodiphenyl disulfides (German Published Application No. 2,440,976); diaminodiphenyl dithioethers (German Published Application No. 2,509,404); aromatic diamines substituted by alkylthio groups (German Published Application No. 2,638,760); aromatic diamines containing sulfonate or carboxylate groups (German Published Application 2,720,166) and the high-melting diamines described in German Published Application No. 2,734,574.

Other compounds which may be used, although less preferably, in the production of the NCO-compound starting materials of the process of the present invention are organofunctional polysiloxanes containing 2 terminal isocyanate-reactive groups and structural units corresponding to the formula —O—Si(R)$_2$-, in which R is a C$_1$–C$_4$-alkyl radical or a phenyl radical, but preferably a methyl radical. Both the pure polysiloxanes containing terminal organofunctional groups known to those in the art and also the known siloxane polyoxyalkylene copolymers containing terminal organofunctional groups are suitable.

The organopolysiloxanes which are preferred correspond to the general formula

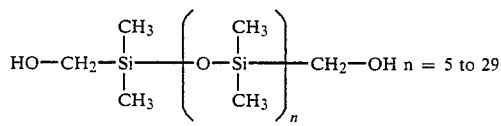

and may be obtained in known manner by equilibration of 1,1,3,3-tetramethyl-1,3-hydroxymethyl disiloxane, which corresponds to the formula

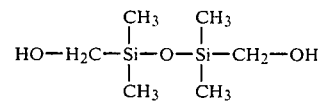

with octamethyl cyclotetrasiloxane in the presence of sulfuric acid or by the process described in German Published Application No. 1,236,505.

The NCO-prepolymers containing free aromatically bound isocyanate groups may be produced in known manner by reacting the reactants either in the melt or in solution. In either case, the equivalent ratio of NCO-groups to active hydrogen atoms (preferably OH-groups) is greater than 1 and, in general, should be between 1.5:1 and 2.8:1. It is of course possible to use an even larger excess of polyisocyanate. The NCO-prepolymers ("NCO-preadducts") generally have an oily to wax-like consistency, depending upon the starting components used. If the NCO/OH-ratio is greater than 2, primarily non-extended NCO-preadducts are obtained. NCO/OH-ratios below 2 result in an increase in the average molecular weight of the NCO-preadducts. It is also possible to use low molecular weight polyols as chain-extending agents in addition to the relatively high molecular weight starting compounds used in the production of the NCO-prepolymers. If such a chain-extending agent is used, relatively high molecular weight NCO-preadducts are obtained.

If the NCO-prepolymers are subjected to distillation (advantageously using a thin-layer evaporator), to remove monomeric polyisocyanates, products containing very little, if any, monomeric polyamine are obtained in the process of the present invention.

NCO-prepolymers which have been obtained from relatively high molecular weight polyols (molecular weight 400 to 12,000) or polyether polyols, optionally using chain-extending agents (molecular weights 62 to 399), by reaction with aromatic diisocyanates in an equivalent ratio of from 1:1.5 to 1:2.8 (preferably from about 1:1.5 to 1:2) are preferred starting materials for the process of the present invention. In any event, the NCO-prepolymers used generally have an NCO-content of from 0.5 to 30 wt %, preferably from 1.2 to 25 wt % and most preferably from 1.5 to 10 wt %. However, so-called "semiprepolymers", i.e. mixtures of NCO-prepolymers with other free polyisocyanates, which may have an even higher NCO-content, for example up to 40 wt % may also be used in the process according to the invention. For practical and economic reasons, however, this is not advisable in most cases.

The starting compounds containing free NCO-groups in the form of their modified isocyanates (generally free from urethane groups) or in the form of their NCO-prepolymers (containing urethane groups) or their "semiprepolymers" have a total NCO-group content of from 0.5 to 40 wt %, preferably from 1.2 to 25 wt % and most preferably, from 1.5 to 10 wt %.

The quantity of water used in the hydrolysis of the NCO-compound should amount to at least twice the stoichiometric quantity of water (calculated on the basis of 1 mole of water for each mole of NCO-groups). The quantity of water used is preferably at least 5 times and, most preferably, at least 10 times the stoichiometric quantity. The amount of water generally exceeds 1 part of water to 100 parts of the isocyanate compound.

The water-miscible polar solvents which may be used in the practice of the present invention are those containing carboxylic acid dialkylamide, lactam, tetraalkyl urea, sulfone, sulfoxide, phosphoric acid dialkylamide, nitrile and ketone groups and having a boiling point in the range from 56° to 250° C. (preferably from 80° to 200° C.) and a dielectric constant of at least 10. In practice, the quantity of polar solvent used is generally at least 5 and, preferably, at least 10 parts of polar solvent to 100 parts of isocyanate compound. However, considerably larger amounts may also be employed. Suitable solvents include: water-soluble, aliphatic or cycloaliphatic acid amides containing from 1 to 10 carbon atoms, for example dimethyl formamide, diethyl formamide, N-methyl pyrrolidone, dimethyl acetamide, caprolactam, formamide with dimethyl formamide (dimethyl acetamide and N-methyl pyrrolidone being preferred); water-soluble, tetra-alkylated aliphatic ureas containing from 4 to 12 C-atoms such as tetramethyl urea or tetraethyl urea; water-soluble aliphatic or cycloaliphatic sulfones or sulfoxides containing from 2 to 10 carbon atoms, such as tetramethylene sulfone or dimethyl sulfoxide; water-soluble, aliphatic or cycloaliphatic phosphoric acid amides such as hexamethyl phosphoric acid triamide; water-soluble acetonitrile; and the water-soluble ketone acetone.

Mixtures of these solvents may also be used. It is preferred to use solvents which boil at a temperature in the range from 56° to 250° C. and most preferably from 80° to 200° C. under normal pressure because such boiling points make them easier to work up.

Preferred water-miscible solvents are dimethyl formamide, dimethyl acetamide and N-methyl pyrrolidone, tetramethylene sulfone, acetonitrile and acetone. Technically, dimethyl formamide and acetonitrile are particularly suitable and readily obtainable. It is less preferred to use the Zerewitinoff-active substances, such as caprolactam or formamide, or substances which are not completely unreactive to amino groups such as acetone but acceptable products are still obtained when they are used.

In the practice of the present invention, it is preferred that the concentration of NCO-compounds in the hydrolysis reaction mixture should be no greater than 60 wt % and more preferably no greater than 40 wt %, i.e. the total amount of water, polar solvent and optionally catalyst is greater than or equal to 40 wt %, preferably greater than or equal to 60 wt %. The sum of isocyanate plus water plus polar solvent plus catalyst should be 100%. The polar solvent, water and, optionally tertiary amine should be used in such a quantity that a substantially homogeneous (at most slightly clouded) or, preferably, a homogeneous clear solution is formed at the reaction temperature.

Preferred tertiary amines are those having an aliphatic or cycloaliphatic structure, although it is also possible to use mixtures of different tertiary amines.

Examples of amines which in general are not completely soluble in water are trialkylamines such as trimethylamine, triethylamine, tripropylamine, triisopropylamine, dimethyl-n-propylamine, tri-n-butylamine, triisobutylamine, triisopentylamine, dimethyl butylamine, triamylamine, trioctyl hexylamine, dodecyl dimethylamine, dimethyl cyclohexylamine, dibutyl cyclohexylamine, dicyclohexyl ethylamine, tetramethyl-1,3-butane diamine; and also tertiary amines containing an araliphatic group, such as dimethyl benzylamine, diethyl benzylamine, α-methyl benzyl dimethyalmine.

It is preferred to use trialkylamines containing a total of 6 to 15 carbon atoms in all of the alkyl radicals (for example, triethylamine, triamylamine and dimethyl cyclohexylamine).

In addition to trialkylamines, other suitable tertiary amines are amines which contain another tertiary amino group or an ether group, particularly in the β-position to the tertiary group. Examples of such amines are dialkylaminoalkyl ethers or bis-dialkylaminoalkyl ethers (U.S. Pat. No. 3,330,782, German Published Application No. 1,030,558) such as dimethyl-(2-ethoxyethyl)-amine, diethyl-(2-methoxypropyl)-amine, bis-[2-dimethylaminoethyl]-ether, bis-[2-diethylaminoethyl]-ether, bis-[2-diethylaminoisopropyl]-ether, 1-ethoxy-2-dimethylaminoethoxy ethane, N-methyl morpholine, N-ethyl morpholine, N-butyl morpholine; also permethylated polyalkylene diamines, such as tetramethyl ethylene diamine, tetramethyl-1,2-propylene diamine, pentamethyl diethylene triamine, hexamethyl triethylene tetramine and higher permethylated homologs (German Published Application Nos. 2,624,527 and 2,624,528), diethyl aminoethyl piperidine, 1,4-diaza-(2,2,2)-dicyclooctane, N,N'-dimethyl piperazine, N,N'-diethyl piperazine, N-methyl-N'-dimethylaminoethyl piperazine, N,N'-bis-dimethyl-aminoethyl piperazine, N,N'-bis-dimethyl-aminopropyl piperazine and other bis-dialkylaminoalkyl piperazines of the type mentioned in German Published Application 2,636,787. It is preferred to use the water-soluble compounds, such as tetramethyl ethylene diamine, permethylated diethylene triamine, N-methyl morpholine, bis-2-dimethylaminoethyl ether and N-methyl piperidine.

It is also possible to use acylated tertiary amine derivatives such as 1-dimethylamino-3-formyl aminopropane, N-(2-dimethylaminoethyl)-propionamide, N-(2-diethylaminoethyl)-benzamide and other tertiary amines containing amide groups (preferably formamide groups) described in German Published Application Nos. 2,523,633 and 2,732,292.

Tertiary amines of relatively weak activity are tertiary amines of the pyridine type and tertiary amines containing at least one aromatic radical attached to the N-atom, for example dimethyl aniline.

If the tertiary amines used are not soluble in water, their boiling point should best be below 250° C. and preferably below 200° C.

The polyvalent metal compounds known from the literature as catalysts in isocyanate chemistry may be used in the process of the present invention. Such compounds are preferably compounds of tin, zinc or lead, for example dibutyl tin dilaurate, tin octoate and lead octoate.

In addition to tertiary amines, other suitable co-catalysts are the hydroxides of the first, second or third Main Group of the Periodic System of Elements known to be useful as catalysts. Specific examples are sodium hydroxide, potassium hydroxide, calcium hydroxide, sodium aluminate, sodium silicate (waterglass), sodium sulfide and sodium cyanide. These co-catalysts are preferably used in quantities of from 1 to 10 parts by weight for every 100 parts of isocyanate starting material.

Alkali carbonates or hydrogen carbonates such as sodium or potassium carbonate or sodium or potassium hydrogen carbonate, optionally in the form of their complexes, with cyclic or acyclic, optionally nitrogen-containing crown ethers, may also be used as co-catalysts but only in combination with a tertiary amine and/or alkali silicate and/or alkali cyanide and/or alkali hydroxide. Examples of crown ether compounds which are soluble in solvents and which contain the above-mentioned sodium carbonate, potassium carbonate and hydrogen carbonate complexes are: (1,13-bis-8-quinolyl)1,4,7,10,13-pentaoxatridecane; 4,7,13,18-tetraoxa-1,10-diazabicyclo-(8,5,5)-eicosane; 4,7,13,16,21-pentaoxa-1,10-diazabicyclo-(8,8,5)-tricosane; 4,7,13,16,21,24-hexoxa-1,10-diazabicyclo-(8,8,8)-hexacosane; 5,6-benzo-4,7,13,16,21,24-hexoxa-1,10-diazabicyclo-(8,8,8)-hexacosane; 1,4,7,10,13,16-hexoxacyclooctadecane; and 2,5,8,11,14,17-hexoxaoctadecane. These compounds are known and are described, for example in a Merck Company brochure entitled "Kontakte 1/77", pages 29 et seq. Mixtures of the above-described catalytically active compounds may also be used.

The above-mentioned catalytically active compounds are generally added to the solution of polar organic solvent and water. Addition to the compound containing isocyanate groups is possible, but not recommended.

The metal catalysts are generally used in quantities of from 0.01 to 1 part by weight, based on isocyanate starting material.

The hydrolysis process may be carried out in the absence of catalyst, i.e in the presence of the water-soluble polar solvents only. If no catalyst is used, however, the polyamines obtained have a reduced amine content. Up to 50 wt % of the polar solvent may be replaced by other solvents, preferably water-soluble solvents such as dioxane or tetrahydrofuran although the quantity of such other solvents used should not be such that the quantity of polar solvent is less than 5 parts for each 100 parts of isocyanate. Further, the homogeneity of the reaction mixture should be maintained even when such other solvents are employed. Use of a mixture of polar solvent and a solvent such as dioxane is not generally preferred. However, in cases where the NCO-compound is present in the form of a solution in such a solvent, use of such a mixture of solvents may be advantageous. If substantially non-polar water soluble solvents are used as the only solvent, the degree of hydrolysis is so low that only inadequately reacted products are obtained, even when tertiary amines or other catalysts are used (see Comparison Examples infra). The same poor results are obtained when a solvent which is not miscible with water is the only solvent used. Distinctly better results are generally obtained in the process of the present invention when a tertiary amine is used as the catalyst in addition to the polar solvent. The tertiary amines may be used in quantities over a wide range. The tertiary amines may be used in relatively small, catalytic quantities of, for example, from 0.1 to 20 parts of tertiary amine to 100 parts of NCO-compound. The polar solvent and the water are preferably used in higher proportions to ensure adequate dilution of the NCO-compound in the reaction mixture when tertiary amines are used.

In order to hydrolyze the NCO-compound to form polyamines having a sufficiently high amine number, it is advantageous to maintain a concentration of the NCO-compound in the reaction mixture of less than 60 wt % (and preferably less than 40 wt %).

Generally, the higher the degree of dilution during the hydrolysis reaction, the higher the conversion to amine. Consequently, the more dilute the reaction mixture, the higher the amine number of the product polyamine and the higher the degree of conversion of the NCO-groups into NH$_2$-groups which can be expected. In practice, a limit to the degree of dilution is imposed by economic considerations relating to the cost in time and money of working up of the polyamine-containing mixture. In practice, this limit is an approximately 3% solution. If the proportion of tertiary amine is significantly increased (for example $\geq$20 parts), the tertiary amine acts as a solvent in addition to the polar solvent.

In any event, it is necessary to use at least enough of polar, water-miscible solvent that, even where tertiary amines which are not particularly miscible with water are used, the reaction mixture remains substantially (preferably completely) homogeneous. Generally, it is desirable for economic reasons to keep the quantity of tertiary amines as small as possible because these amines are generally more expensive than the polar solvent.

In a less preferred embodiment of the present invention, compounds containing "H-active groups" and two or more hydroxy, amino and/or thiol groups may be added to the reaction mixture. Compounds of this type were described above as synthesis components for the NCO-compounds used as starting materials in the process of the present invention. Difunctional to optionally tetrafunctional compounds having a molecular weight in the range from 62 to 2000, particularly those containing at least two primary hydroxy groups (for example, ethane diol, butane diol, 1,2-propane diol, polyethylene glycols, trimethylol propane or the like) are preferred compounds containing H-active groups. It is of course also possible to use compounds containing different "H-active groups", for example aminoethanols.

Compounds containing only one H-active group such as methanol, ethanol, cyclohexanol, cyclohexylamine, aniline, asymmetrical dimethyl hydrazine and dimethylaminopropylamine may be used as monofunctional chain terminators.

Pre-extension can occur as a secondary reaction in the process of the present invention, i.e. isocyanate and already-formed amine react with chain attachment to form ureas. This secondary reaction may be largely suppressed by working in dilute solution and also by using a catalyst. Although it is desirable that secondary reactions of this nature should take place to the least possible extent, a certain degree of pre-extension is acceptable on the basis of economics. In an elastomer made from a polyamine produced by the process of the present invention, approximately 18% of the NCO-groups is reacted with amino groups in the pre-extending reaction to form ureas. The properties of this elastomer did not deteriorate significantly from those of an elastomer made from an amine in which the secondary reaction had been substantially completely suppressed.

The process of the present invention is preferably carried out in homogeneous phase. A slight overgauging of the quantity of water or the quantity of NCO-compound may cause some clouding of the reaction mixture because the starting materials are no longer completely dissolved. Such clouding will not deleteriously affect the product. However, if the hydrolysis reaction is carried out in heterogeneous phase (for example, by the excessive addition of water with precipitation of the NCO-prepolymer) unsatisfactory products are obtained.

The optimal mixing ratios, which depend upon the starting compounds used, may readily be determined by a few preliminary tests. The hydrolysis reaction may be carried out at a temperature in the range from $-10°$ to $+150°$ C. However, it is preferably carried out at temperatures in the range from 80° to 130° C. because the best volume/time yields and high solubility are obtained at temperatures in that range. It is particularly preferred to carry out the hydrolysis reaction at the boiling point of the mixture which, due to the presence of water, is generally in the range from about 90° to 100° C. In some cases, it may even be necessary to carry out the reaction under pressure in order to obtain sufficiently high temperatures.

The onset of the reaction is recognizable by the almost spontaneous elimination of $CO_2$. It is important to ensure that the reactants are mixed rapidly and very thoroughly. The reaction may be carried out either continuously or in batches.

In one batch-type procedure, the NCO-group-containing compound is introduced into aqueous polar solvent mixture optionally containing tertiary amines or other catalyst. This may be done by means of a dropping funnel or by mechanical injection using a nozzle, provided that thorough distribution of the reactants is ensured, e.g. by intensive stirring.

In a continuous embodiment of this invention which is particularly suitable for large scale operation, the NCO-compound (optionally in the form of a solution) and the aqueous solution are separately delivered to a common reaction zone, intensively mixed (for example by means of a flow mixer) and reacted and then rapidly discharged from the reaction zone. The components may be metered for example by means of graduated dropping funnels or by means of a piston and/or diaphragm metering pump or any other metering unit. In the case of continuous metering, it is preferred to mix, react and discharge the two components from the reaction zone very quickly (in seconds or fractions of a second) using a suitable, optionally mechanical, unit.

Various additives may be used to facilitate the reaction of the isocyanate groups with the aqueous tertiary amine phase. Thus, one or more standard commercial emulsifiers may be used in quantities of from 0.01 to 1 part by weight to 100 parts of reaction mixture to promote homogenization. However, such emulsifiers are not necessary where homogeneous reaction mixtures (dissolved components) are used. Flow mixers suitable for use in the continuous process include static mixers (fixed baffles) and dynamic mixers (moving parts on the rotor/stator principle). These mixers may either be heated or cooled. Where a static mixer is used, the necessary mixing energy is generated by a pump. In a dynamic mixer, a separate motor drives the rotor. In every case, the conversion of the isocyanate groups to amino groups depends upon the power applied and the shear forces generated (i.e. upon the rapid, homogeneous dispersion of the NCO-compound in the reaction medium).

The static mixers used in the process of the present invention may be simple baffles (for example coils) or complicated baffles (for example packing mixers) or multichannel mixers. It is also possible to use mixing nozzles or the mixing chambers in the HK-machines manufactured by the Hennecke Company (Birlinghoven, Federal Republic of Germany), into which the starting products are injected under high pressure (countercurrent injection). Dynamic mixers suitable for use in the process of the present invention are the flow mixers which operate on the stator-rotor principle in the same way as known impeller homogenizers, but which cannot be used for delivery or transporting purposes. The necessary mixing energy is generally between about 1 and 10 KW per liter of mixer volume, depending upon the required degree of dispersion, the type of mixer used and the viscosity of the starting materials.

On completion of mixing, the mixture may be directly worked up into the polyamine or, alternatively, may even be left to after-react for a short time (generally less than 5 minutes). In the latter case, the reaction mixture is preferably refluxed gently under normal pressure in order to separate off all the carbon dioxide formed. However, the reaction mixture may also be heated for longer periods without any disadvantage.

Working up of the reaction mixture may also be carried out continuously or in batches. The reaction mixture is normally worked up by distillation, by extraction or by phase separation.

Working up by distillation generally begins without a vacuum and, depending upon the boiling point of the solvents used, the volatile constituents are subsequently distilled off under reduced pressure. In general, sump temperatures (in the residual polyamine) of from 100° to about 130° C. are maintained towards the end of the concentration-by-evaporation phase.

Where a thin-layer evaporator is used, distinctly higher temperatures, for example in the range from 170° to 200° C., may briefly be reached in the polyamine.

Extraction processes after dilution with water may be carried out using water-insoluble solvents, such as methylene chloride or chlorobenzene, but such solvents are not recommended.

Phase separation of the reaction mixture by cooling sometimes occurs if the hydrolysis has been carried out at relatively high temperatures and in the presence of a relatively large quantity of water at the solubility limit. Phase separation may be completed or actually brought about by the addition of water. The aqueous phase containing polar water-miscible solvent and also the catalyst (if a catalyst is used) is separated off from the polyamine phase. In general, the aqueous phase may be directly re-used.

In addition to the polyamine, the polyamine phase contains residues of the polar solvent and a little water together with a little catalyst (if any). These residues may be completely removed by distillation, optionally in vacuo, or by thin-layer distillation.

If the NCO-group-containing compound still contains free, i.e. monomeric, isocyanate from its production, the monomeric amine formed therefrom may accumulate to a considerable extent in the water/organic solvent phase. In that case, the polyamine obtained by this simple working-up procedure is subastantially free from monomer. However, it is advisable to free the aqueous solution from monomeric amine by working up before it is re-used.

The polyamines obtained in accordance with the invention are generally colorless to faintly colored, medium viscosity to high-viscosity, optionally relatively high-melting products having amino group contents from 0.19 to 20.3 wt %. Depending upon the starting isocyanate material, these polyamines additionally contain urethane and/or urea and/or uret dione and/or isocyanurate and/or biuret groups and, optionally, ether and/or acetal and/or carbonate and/or ester and/or thioether and/or dialkyl siloxane groups and/or the residues of polybutadienes of the type which were initially present in the NCO-compound. However, additional bonds can be formed by secondary reactions, for example urea groups can be formed from already hydrolyzed fractions and residual NCO-groups during the hydrolysis reaction. The quantity of primary amino groups present in the polyamines corresponds at most to the quantity of NCO-groups in the NCO-compounds and ranges from approximately 0.19 to 20.3 wt % $NH_2$, preferably from 0.46 to 11.3 wt % $NH_2$ and, most preferably, 0.58 to 4.1 wt % $NH_2$.

NCO-groups attached to aliphatic radicals give highly reactive aliphatic amines as hyrolysis products. These aliphatic amines react very quickly with NCO-groups still present to form urea compounds and thereby form relatively high molecular weight polyurea amines having a low $NH_2$-content.

By virtue of their low vapor pressure, the aromatic polyamines obtained in accordance with the present invention are preferably used as reactants for optionally blocked polyisocyanates in the production of polyurethanes (polyurethane ureas), optionally cellular polyurethane plastics or polyurethane foams, in which case they may even be combined with other low molecular weight (molecular weight 32 to 399) and/or relatively high molecular weight (molecular weight 400 to approximately 12,000) compounds containing isocyanate-reactive groups. Suitable starting components for the production of polyurethanes were described above in connection with the production of the prepolymers suitable as isocyanate starting materials for the process of the present invention. Appropriate materials for the production of polyurethanes are also described in German Published Applications 2,302,564; 2,432,764 (U.S. Pat. Nos. 3,903,679); 2,639,083; 2,512,385; 2,513,815; 2,550,796; 2,550,797; 2,550,833; 2,550,860 and 2,550,862. These publications also teach auxiliaries and additives of the type which may optionally be used in the production of polyurethanes. The present invention also relates to the production of polyurethanes (ureas) using the polyamines produced in accordance with the invention. Such polyurethanes (ureas) may be used, for example, for elastomers, coatings, filaments spun from melts, solutions, dispersions or as a mixture of reactive components. The polyamines produced in accordance with the present invention may also be used as coupling components for diaza dyes, as hardeners for epoxide and phenolic resins and in any other known reactions involving amines, such as amide or imide formation.

The process of the present invention is illustrated by the following Examples. Unless otherwise indicated, all quantities are given as parts by weight or percentages by weight.

EXAMPLES

The following compounds containing isocyanate groups were used in the Examples and the Comparison Examples which follow:

I  A prepolymer having an NCO-content of 3.5% produced from 2,4-tolylene diisocyanate and a difunctional polypropylene glycol ether having an average molecular weight of 2000 and a functionality of 2.

Ia Prepolymer I after thin-layer distillation.

II A prepolymer having an NCO-content of 3.5% produced from a mixture of 80% of 2,4-tolylene diisocyanate and 20% of 2,6-tolylene diisocyanate and a difunctional polypropylene glycol ether having an average molecular weight of 2000 and a functionality of 2.

III A prepolymer having an NCO-content of 3.5% produced from 2,4-tolylene diisocyanate and a propylene-glycol-started propylene oxide/ethylene oxide mixed polyether polyol having an average molecular weight of 2000, a functionality of 2, and ethylene oxide content of 20 wt %.

IV A prepolymer having an NCO-content of 4.5% produced from a mixture of 80% of 2,4-tolylene diisocyanate and 20% of 2,6-tolylene diisocyanate and a polypropylene glycol ether having an average molecular weight of 1500 and a functionality of 2.

V A prepolymer having an NCO-content of 6.0% produced from 2,4-tolylene diisocyanate and a polypropylene glycol ether having an average molecular weight of 1000 and a functionality of 2.

VI A prepolymer having an NCO-content of 7.6% produced from 2,4-tolylene diisocyanate and a propylene-glycol-started propylene oxide/ethylene oxide mixed polyether polyol having an average molecular weight of 750, a functionality of 2 and an ethylene oxide-content of 15 wt %.

VII A prepolymer having an NCO-content of 1.9% produced from 2,4-tolylene diisocyanate and a propylene-glycol-started propyleneoxide/ethylene oxide mixed polyether polyol having an average molecular weight of 4000, a functionality of 2, and an ethylene oxide-content of 20 wt %.

VIII A propolymer having an NCO-content of 3.3% produced from a mixture of 50% of 2,4'-diisocyanatodiphenyl methane and 50% of 4,4'-diisocyanatodiphenyl methane and a propylene-glycol-started propylene oxide/ethylene oxide mixed polyether polyol having an average molecular weight of 2000, a functionality of 2, and an ethylene oxide-content of 20 wt %.

IX A prepolymer having an NCO-content of 2.8% produced from 2,4-tolylene diisocyanate and a polypropylene glycol ether having an average molecular weight of 1500 and a functionality of 2.

X A prepolymer having an NCO-content of 3.5% produced from 2,4-tolylene diisocyanate and a polytetrahydrofuran having an average molecular weight of 2000 and a functionality of 2.

XI A thin-layered prepolymer having an NCO-content of 2.1% produced from 2,4-tolylene diisocyanate and a trimethylol-propane-started propylene oxide-polyether having an average molecular weight of 6000, a functionality of 3, and an ethylene oxide-content of 13 wt %.

XII A prepolymer having an NCO-content of 3.2% produced from 2,4-tolylene diisocyanate and a polyester having an average molecular weight of 2000 (synthesized from 1,4-butane diol, 1,6-hexane diol (50/50) and adipic acid) and a functionality of 2.

XIII A prepolymer having an NCO-content of 3.2% produced from 2,4-tolylene diisocyanate and a polyester having an average molecular weight of 2000 (synthesized from butane diol/ethylene glycol (50/50) and adipic acid) and a functionality of 2.

XIV A prepolymer having an NCO-content of 4.5% produced from 2,4-tolylene diisocyanate and a linear polypropylene glycol ether having an average molecular weight of 2000 and 1,4-butane diol (molar ratio 3:1).

XV A prepolymer having an NCO-content of 3.1% produced from 2,4-tolylene diisocyanate and a difunctional polycaprolactone (starter: 1,6-hexane diol) having an average molecular weight of 2200.

XVI A thin-layered prepolymer having an NCO-content of 3.3% produced from a mixture of 65% of 2,4-tolylene diisocyanate and 35% of 2,6-tolylene diisocyanate and a polyester having an average molecular weight of 2000 (synthesized from butane diol/ethylene glycol (50/50) and acipic acid) and a functionality (f) of 2.

XVII A prepolymer having an NCO-content of 1.8% produced from 2,4-tolylene diisocyanate and a difunctional propylene oxide/ethylene oxide mixed polyether polyol having an average molecular weight of 2000 and containing 13.8% of a polymer of styrene and acrylonitrile in a ratio of 44:56 (ethylene oxide-content of the polyether=15 wt %).

XVIII A prepolymer having an NCO-content of 3.2% produced from 4,4'-diphenyl methane diisocyanate and a propyleneglycol-started propylene oxide/ethylene oxide mixed polyether (20% ethylene oxide) having an average molecular weight of 2000; f=2.

COMPARISON EXAMPLES

EXAMPLE A 100 g of isocyanate compound I were added with extremely vigorous stirring to a solution of 1000 g of water and 10 ml of bis-2-dimethylaminodiethyl ether. After 30 minutes, a viscous, completely homogeneous clouded mass was obtained. This clouded mass was completely useable for further processing.

EXAMPLE B 100 g of isocyanate compound I were added with vigorous stirring over a period of 15 minutes to 300 g of ethyl acetate and 50 g of water. After stirring for 1 hour at 65° C., the mixture was worked up by distillation in a water jet vacuum at a sump temperature of 120° C. A non-stirrable, rubber-like clouded mass was obtained. The amine number was determined to be only 5.6 (mg of KOH/g) (calculated amine number 46.7). The conversion of NCO to $NH_2$ was 12% ((5.6/46.7)) of theoretical.

EXAMPLE C 100 g of isocyanate compound I were added with vigorous stirring over a period of 15 minutes at 90° C. to 300 g of dioxane and 50 g of water. The clear solution was kept at 85° C. for 1 hour, after which the dioxane and water were distilled off in a water jet vacuum at a sump temperature of up to 120° C. A slightly clouded mass was obtained. This mass was still fluid at 100° C., but assumed an almost rubber-like consistency at room temperature. Its amine number was 13.6 (mg of KOH/g) (calculated amine number: 46.7). The conversion of NCO to $NH_2$ was 29% ((13.6/46.7)) of theoretical.

The amine number was determined by the method described in Houben-Weyl, Methoden der Organischen Chemie, Vol. II (1953), pages 660–61, by titration in glacial acetic acid using perchloric acid. By acetylating the primary amine and subsequently titrating the tertiary amine with perchloric acid, it is possible to distinguish between the residue of catalyst (tertiary amine) if any, and the amine number (primary amine).

EXAMPLE 1

300 g of dimethyl formamide (DMF), 12 g of water and 10 ml of triethylamine were heated to 90°–95° C., followed by the addition of 100 g of NCO-prepolymer I with vigorous stirring over a period of 10 to 15 minutes. The reaction mixture was then distilled in a water jet vacuum at a sump temperature of up to 120° C. The polyamine (amine number of 40 (mg of KOH/g)) remained behind. The yield amounted to more than 95% of the theoretical. The maximum amine number theoretically attainable was 46.7 (mg of KOH/g). The conversion of NCO to $NH_2$ was 86% of theoretical.

EXAMPLES 2a–2v

The procedure for Examples 2a–2v, which are listed in Table 1 was the same as that described in Example 1. The quantitative ratios were not optimized.

TABLE 1

| Example No. | Prepolymer No. (100 g) | DMF g | Water g | Triethylamine ml | Amine number (mg of KOH/g) |
|---|---|---|---|---|---|
| 2a | II | 300 | 50 | 10 | 40 |
| 2b | III | 300 | 50 | 10 | 41 |
| 2c | IV | 600 | 100 | 20 | 55 |
| 2d | V | 600 | 100 | 20 | 72 |
| 2e | VI | 300 | 125 | 10 | 71 |
| 2f | VII | 600 | 100 | 20 | 23 |
| 2g | VIII | 600 | 100 | 20 | 38 |
| 2h | I | 300 | 50 | 5 | 39 |
| 2j | I | 300 | 50 | 20 | 41.5 |
| 2k | I | 300 | 25 | 10 | 44 |
| 2l | IX | 300 | 50 | 10 | 36 |
| 2m | X | 800 | 50 | 10 | 43.2 |
| 2n | XI | 600 | 100 | 20 | 26.4 |
| 2o | Ia | 300 | 50 | 10 | 45 |
| 2p | XII | 300 | 50 | 10 | 36 |
| 2q | XIII | 300 | 50 | 10 | 38 |
| 2r | XIV | 300 | 50 | 10 | 52 |
| 2s | XV | 600 | 100 | 20 | 37 |
| 2t | XVI | 300 | 50 | 10 | 41 |
| 2u | XVII | 300 | 50 | 10 | 21 |
| 2v | XVIII | 1200 | 200 | 40 | 35 |

EXAMPLES 3a–3k

The procedure for Examples 3a–3k, which are listed in Table 2, was the same as that described in Example 1 using polyisocyanate I, except that different catalysts were used. The quantitative ratios were not optimized.

TABLE 2

| Example No. | Prepolymer I g | DMF g | Water g | Catalyst | Amine No. (mg of KOH/g) |
|---|---|---|---|---|---|
| 3a | 100 | 300 | 50 | 2.6 g of bis-2-dimethyl aminoethyl ether | 34 |
| 3b | 100 | 300 | 50 | 10 ml of permethyl diethylene triamine | 39 |
| 3c | 100 | 300 | 50 | 10 ml of tetramethyl ethylene diamine (68% aqueous solution) | 37 |
| 3d | 100 | 300 | 25 | 10 ml of triethyl amine | 42 |
| 3e | 100 | 300 | 50 | 10 ml of dimethyl benzyl amine | 33 |
| 3f | 100 | 300 | 50 | 10 ml of N—methyl morpholine | 30 |
| 3g | 100 | 1200 | 400 | 0.7 g of bis-2-dimethyl aminoethyl ether | 43 |
| 3h | 100 | 300 | 50 | 2.5 g of 1,4-diaza-2,2,2- | 38 |

TABLE 2-continued

| Example No. | Quantities Used | | | | Amine No. (mg of KOH/g) |
|---|---|---|---|---|---|
| | Prepolymer I g | DMF g | Water g | Catalyst | |
| 3j | 100 | 300 | 50 | bicyclooctane 5 g of dibutyl tin dilaurate | 38 |
| 3k | 100 | 300 | 50 | 10 g of N,N—di-methyl aniline | 28 |

EXAMPLES 4a–4j

The procedure for Examples 4a–4j (listed in Table 3) was the same as that described in Example 1 using polyisocyanate I, except that different solvents were used. Other changes are noted in Table 3. The quantitative ratios were not optimized.

TABLE 3

| Example No. | Quantities used (per 100 g of prepolymer) | | | Reaction temperature (°C.) | Amine Number (mg of KOH/g) |
|---|---|---|---|---|---|
| | Water ml | Bis-2-dimethyl-aminoethyl ether g | Solvent ml | | |
| 4a | 50 | 2.6 | 310 DMF | 90 | 33 |
| 4b | 50 | — | 310 DMF | 90 | 27 |
| 4c | 200 | — | 1200 DMF | 90 | 32 |
| 4d | 50 | 2.6 | 300 N—methyl pyrrolidone | 90 | 34.5 |
| 4e | 100 | 2.6 | 300 tetra-methyl urea | 90 | 29 |
| 4f | 80 | 2.6 | 600 acetone | 57 | 29 |
| 4g | 50 | 2.6 | 300 dimethyl acetamide | 90 | 34 |
| 4h | 70 | 2.6 | 300 aceto-nitrile | 75 | 31 |
| 4j* | 50 | 2.6 | 300 tetra-methylene sulfone | 95 | 34 |

*Distillation in a high vacuum

EXAMPLE 5

100 g of polyisocyanate III were run with vigorous stirring over a period of 15 minutes at 25° C. into 600 g of DMF, 100 g of water and 20 ml of triethylamine. The reaction mixture became slightly cloudy. After 1 hour at 25° C., it was heated for 30 minutes to 90° C. and subsequently concentrated in a water jet vacuum at a sump temperature of up to 120° C. 91 g of polyamine having an amine number of 42 were obtained.

EXAMPLE 6

300 g of dimethyl formamide, 60 ml of water and 10 ml of triethylamine were heated to 90° C., followed by the addition of 100 g of Prepolymer I with vigorous stirring over a period of 10 to 15 minutes. After cooling to room temperature, the two phases which had formed were separated. Both phases were worked up by distillation in a water jet vacuum at a sump temperature of up to 120° C. 91 g of substantially colorless aminopolyether having an amine number of 36 were obtained. According to analysis by gas chromatography, it was substantially free from monomeric 2,4-tolylene diamine. 6 g of a dark colored polyamine having an amine number of 100 were obtained from the second phase, approximately 4% of this polyamine consisting of 2,4-tolylene diamine.

EXAMPLE 7

The procedure was the same as that used in Example 6, except that the water/DMF/triethylamine phase was not worked up by distillation, but instead was recycled. The composition of this phase was determined by gas chromatography and the small quantities of water, DMF and triethylamine missing were made up to form the quantities used in Example 6.

100 g of Prepolymer I were added with vigorous stirring to this water/DMF/triethylamine solution after it had been heated to 90° C. After stirring for 4 minutes at 90° C., the reaction mixture was worked up by distillation in a water jet vacuum at a sump temperature of up to 120° C. The polyamine having an amine number of 41.6 remained as residue.

EXAMPLE 8

A solution heated to 50° C. of 100 g of dimethyl formamide and 100 g of Prepolymer I and a solution heated to 90° C. of 200 g of DMF, 25 ml of water and 10 ml of triethylamine were quickly combined, followed by heating to 80° C. The reaction mixture was worked up by distillation in a water jet vacuum at a sump temperature of up to 120° C. The polyamine which had an amine number of 41.6 was left behind.

EXAMPLE 9

2 g of sodium carbonate were suspended at 90° C. in 250 g of dimethyl formamide and 50 g of water, followed by the addition of 100 g of Prepolymer I with vigorous stirring. After stirring for another 4 minutes at 90° C., the reaction mixture was cooled. The polyamine phase was separated off, diluted with methylene chloride and washed repeatedly with water. After concentration, the last traces of DMF were removed, ultimately in a high vacuum, at a sump temperature of up to 120° C. The polyamine left behind had an amine number of 36.

EXAMPLE 10

The procedure was the same as that used in Example 9, except that a mixture of 1.4 g of potassium carbonate and 7.0 g of 18-crown-6 was used as catalyst. The reaction solution was homogeneous. After working up in the same way as before, the polyamine having an amine number of 37 was combined.

EXAMPLE 11

100 parts of an NCO-prepolymer (NCO-content 6.86%) which had been produced from a mixture of 50% of 2,4'-diisocyantodiphenyl methane and 50% of 4,4'-diisocyanatodiphenyl methane and a linear polypropylene glycol ether having an average molecular weight of 1500 were reacted at 70° C. with a crosslinker mixture. The crosslinker mixture was made up of 85 parts of an aminopolyether (amine number 30) produced by the process according to the invention from an NCO-prepolymer (of 2,4-tolylene diisocyanate and a linear polypropylene glycol ether having an average molecular weight of 2000) and 10 parts of an isomer mixture of 1,3'-diamino-2,4-diethyl-6-methyl benzene and 1,3-diamino-4,6-diethyl-2-methyl benzene ("DETA"). For data, see Table 4.

EXAMPLE 12

All the components and conditions were the same as those used in Example 11, except that the aminopolyether had an amine number of 44.5. For data, see Table 4.

TABLE 4

| | | Example 11 | Example 12 |
|---|---|---|---|
| Crosslinker Mixture (A) | Aminopoly-ether (pbw) | 85 | 85 |
| | NH—number | 30 | 44 |
| | DETA (pbw) | 10 | 10 |
| Prepolymer (B) | | 6.86% NCO | 6.84% NCO |
| A:B | Mixing ratio (pbw) | 100:89.4 | 100:78.5 |
| | Prepolymer/ crosslinker mixture (NCO/NH— equivalent ratio | 110 | 110 |
| Tensile Strength DIN 53 504 | σ-100 MPa | 3.7 | 4.1 |
| | σ-300 MPa | 6.5 | 7.4 |
| | σ-500 MPa | 10.1 | 12.1 |
| | σ-rupt. MPa | 25.2 | 29.7 |
| | % | 750 | 680 |
| Tear propagation resistance DIN 53 515 | KN/m | 25.5 | 26.8 |
| Shore Hardness DIN 53 505 | A | 71 | 72 |
| Elasticity DIN 53 512 | % | 41 | 41 |
| Compression set DIN 53 517 (24 h-70° C.) | % | 36 | 33 |
| Abrasion DIN 53 516 | mm³ | 99 | 90 |
| Pouring time (sec) | | 10 | 11 |
| Flex time (mins) | | immediately flex-resistant | immediately flex-resistant |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A single-stage process for the production of a polyamine containing aromatically bound primary amino groups comprising hydrolyzing
   (a) a compound containing aromatically bound NCO-groups which has an NCO-content of from 0.5 to 40 wt % with
   (b) an excess of water in the presence of
   (c) a water-miscible polar solvent having a boiling point of from 56° to 250° C. and a dielectric constant of at least 10 which solvent is present in a quantity of at least 5 parts solvent for every 100 parts of isocyanate compound (a)

at a temperature of from −10° to 150° C. in a manner such that the reaction mixture is kept substantially homogeneous.

2. The process of claim 1 in which at least 2 moles of water are present for each equivalent of NCO-groups present in (a).

3. The process of claim 1 in which at least 0.1 part of tertiary amine for each 100 parts of isocyanate (a) and/or 0.1 to 10 parts of alkali silicate and/or alkali cyanide and/or hydroxide of an element in Group IA and/or IIA and/or IIIA of the Periodic System of Elements for each 100 parts of isocyanate (a) and/or 0.01 to 10 wt % (based on isocyanate (a)) polyfunctional metal are used as a catalyst.

4. The process of claim 1 in which the water-miscible polar solvent contains at least one group selected from carboxylic acid, dialkylamide, lactam, tetraalkyl urea, sulfone, sulfoxide, phosphoric acid dialkylamide, nitrile and ketone groups.

5. The process of claim 1 in which a mixture of an NCO-prepolymer made from an isocyanate having an NCO-content of from 1.5 to 10 wt %, a relatively high molecular weight polyol (molecular weight of 400 to 12,000), optionally a chain extending agent having a molecular weight of 62 to 399 and an aromatic diisocyanate is used as isocyanate compound (a).

6. The process of claim 1 in which water is used in a quantity of at least 5 moles for each NCO-equivalent of (a).

7. The process of claim 1 in which the water-miscible polar solvent is selected from the group consisting of dimethyl formamide, dimethyl acetamide, N-methyl pyrrolidone, tetramethylene sulfone, acetonitrile, acetone and mixtures thereof.

8. The process of claim 7 in which the water-miscible polar solvent is used in a quantity of at least 10 parts of solvent for every 100 parts of isocyanate (a).

9. The process of claim 1 in which acetonitrile and/or dimethyl formamide is used as the water-miscible polar solvent.

10. The process of claim 1 in which an aliphatic or cycloaliphatic tertiary amine having a boiling point of up to 250° C. is used as a catalyst.

11. The process of claim 1 in which a catalyst selected from the group consisting of triethylamine, tripropylamine, tributylamine and mixtures thereof is used.

12. The process of claim 1 in which the sum of the amounts of water, water-miscible polar solvent and any catalyst is at least 40 parts for every 100 parts of reaction mixture.

* * * * *